United States Patent
Kim et al.

(10) Patent No.: US 11,496,174 B1
(45) Date of Patent: Nov. 8, 2022

(54) CARRIER AND SAMPLING FREQUENCY OFFSET ESTIMATION FOR RF COMMUNICATION WITH CRYSTAL-LESS NODES

(71) Applicant: THE REGENTS OF THE UNIVERSITY OF MICHIGAN, Ann Arbor, MI (US)

(72) Inventors: Hun-Seok Kim, Ann Arbor, MI (US); Chin-Wei Hsu, Ann Arbor, MI (US); David T. Blaauw, Ann Arbor, MI (US); Benjamin Kempke, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 71 days.

(21) Appl. No.: 17/162,056

(22) Filed: Jan. 29, 2021

Related U.S. Application Data

(60) Provisional application No. 62/968,528, filed on Jan. 31, 2020.

(51) Int. Cl.
| | |
|---|---|
| *H04B 1/00* | (2006.01) |
| *H04B 1/38* | (2015.01) |
| *H04L 67/12* | (2022.01) |

(52) U.S. Cl.
CPC .............. *H04B 1/38* (2013.01); *H04L 67/12* (2013.01)

(58) Field of Classification Search
CPC ... H04B 1/707; H04B 7/0452; H04L 27/2613; H04L 27/2602; H04W 74/006; H04W 72/0413; H04W 56/0035

(Continued)

(56) References Cited

U.S. PATENT DOCUMENTS

| 8,254,241 B2 | 8/2012 | Branlund et al. |
| 2012/0195401 A1* | 8/2012 | Becker .................... H04L 7/042 375/368 |
| 2016/0275788 A1* | 9/2016 | Wu .......................... G08G 1/02 |

FOREIGN PATENT DOCUMENTS

| CN | 104660528 A | 5/2015 |

OTHER PUBLICATIONS

E. Lopelli, J. Van Der Tang, and A. H. M. Van Roermund, "A frequency offset recovery algorithm for crystal-less transmitters," in *IEEE International Symposium on Personal, Indoor and Mobile Radio Communications, PIMRC*, 2006.

(Continued)

*Primary Examiner* — Khai Tran
(74) *Attorney, Agent, or Firm* — Harness, Dickey & Pierce, P.L.C.

(57) ABSTRACT

When the ultra-low power mm-scale sensor node does not have a crystal oscillator and phase-lock loop, it inevitably exhibits significant carrier frequency offset (CFO) and sampling frequency offset (SFO) with respect to the reference frequencies in the gateway. This disclosure enables efficient real-time calculation of accurate SFO and CFO at the gateway, thus the ultra-low power mm-scale sensor node can be realized without a costly and bulky clock reference crystal and also power-hungry phase lock loop. In the proposed system, the crystal-less sensor starts transmission with repetitive RF pulses with a constant interval, followed by the data payload using pulse-position modulation (PPM). A proposed algorithm uses a two-dimensional (2D) fast Fourier transform (FFT) based process that identifies the SFO and CFO at the same time to establish successful wireless communication between the gateway and crystal-less sensor nodes.

18 Claims, 13 Drawing Sheets

(58) Field of Classification Search
USPC .................................................. 375/140, 376
See application file for complete search history.

(56) References Cited

OTHER PUBLICATIONS

M. Cai, Z. Wang, Y. Luo, and S. Mirabbasi, "An RF-Powered Crystal-Less Double-Mixing Receiver for Miniaturized Biomedical Implants," *IEEE Trans. Microw. Theory Tech.*, vol. 66, No. 11, pp. 5129-5140, Nov. 2018.

\* cited by examiner

CARRIER AND SAMPLING FREQUENCY OFFSET ESTIMATION FOR RF COMMUNICATION WITH CRYSTAL-LESS NODES

CROSS-REFERENCE TO RELATED APPLICATION

This application claims the benefit of U.S. Provisional Application No. 62/968,528, filed on Jan. 31, 2020. The entire disclosure of the above application is incorporated herein by reference.

GOVERNMENT CLAUSE

This invention was made with government support under HR001118C0043 and FA8750-18-C-0134 awarded by the U.S. Department of Defense, Defense Advanced Research Projects Agency. The government has certain rights in the invention.

FIELD

The present disclosure relates to carrier and sampling frequency offset estimation in wireless communication systems.

BACKGROUND

The number of connected smart devices is fast growing towards the highly anticipated vision of the ubiquitous Internet-of-Things (IoT). Along the trend of explosive growth of connected IoT devices, the sensor node's form-factor has recently scaled down to centimeter, or more aggressively to millimeter scales. Making the wireless sensing system smaller, lower-power and more affordable has become an important problem for both industry and academic research. A mm-scale distributed sensor node enables novel applications such as industrial ubiquitous sensors, smart cities, agricultural monitoring, implantable bio-medical devices and unobtrusive surveillance systems, There are two main challenges for these applications to thrive, cost and performance. As a result, the communication solution for these IoT applications needs to cover a long (10's of meter) distance while maintaining the ultra-small (mm-scale) form-factor including the antenna.

There are numerous challenges for radio systems when fully integrated within a mm-scale form-factor. First, the extremely limited system dimension constrains the usage of off-chip components. Even the smallest crystal oscillator is considered to be excessively large for the target system dimension. Second, the system needs to be powered by mm-scale thin-film batteries, which have extremely small capacity (<10µAh) and high internal resistance (10-30 kΩ) that limits the peak current of the battery to be <100µW. Third, as these batteries cannot be easily replaced, the system needs to be energy-autonomous, recharging the battery via harvested ambient energy. Lastly, an electrically-small mm-scale antenna typically results in very poor antenna efficiency especially at a relatively lower frequency (sub-GHz) which is preferred for better wall penetration in non-line-of-sight (NLOS) scenarios. For example, a 3×3×2 mm$^3$ printed antenna has 0.46% efficiency at 915 MHz although it was carefully designed for the maximum efficiency given the area constraint.

While there are many existing international standards for IoT connectivity such as Bluetooth Low-Energy (BLE) and ZigBee, their relatively high carrier frequency, complexity, and power consumption limit their NLOS communication distance and/or applicability to mm-scale sensor nodes. Z-wave targets the longer distance indoor environment by using a lower carrier frequency (sub-GHz). But all of the existing systems impose a stringent specification for the frequency accuracy, existing systems impose a stringent specification for the frequency accuracy, timing stability, and quality of the continuous waveform that are unattainable in a mm-scale energy-autonomous wireless node. Active research is on-going in the area of the ultra-low power (ULP) wireless communication solutions. However, they typically focus on low-power transceiver front-end designs and do not address system integration challenges or power management issues that are unique and critical to the mm-scale IoT systems.

In this disclosure, an energy-autonomous radio system fully integrated within a 3×3×3 mm$^3$ form-factor operating in the 915 MHz ISM band for indoor NLOS communications is proposed. The system is constructed from several layers (chips) that are stacked, connected through wire bonding and placed on one side of a miniaturized printed antenna. The system is crystal-less and solely powered by the energy harvested from a mm-scale PV cell. Amongst the different techniques used to achieve an ultra-low power, crystal-less mm-scale system for 20 m bidirectional communication to a gateway, this disclosure presents a novel synchronization protocol employed to improve the sensor ode receiver energy efficiency and to allow crystal-free PLL-less operation of the mm-scale sensor node by utilizing accurate timing and frequency offset estimation capability implemented on the gateway, This section provides background information related to the present disclosure which is not necessarily prior art.

SUMMARY

This section provides a general summary of the disclosure, and is not a comprehensive disclosure of its full scope or all of its features.

A method is presented for determining frequency offsets in a wireless communication system. The method includes: receiving an incoming signal over a wireless communication channel from a transmitter, where the incoming signal has a carrier oscillating at radio frequencies and at least a portion of the incoming signal is modulated by a periodic symbol; partitioning the portion of the incoming signal into a plurality of segments; for each segment in the plurality of segments, applying a transform to a given segment and stacking results from the transform to build a first two dimensional matrix, such that the transform analyzes frequency content of the given segment, wherein one dimension in the first matrix corresponds to a carrier frequency within a range of possible carrier frequency offsets and other dimension in the first matrix corresponds to a different segment in the plurality of segments; for each carrier frequency in the range of possible carrier frequency offsets, applying the transform to data associated with a given carrier frequency and thereby generate a second two dimensional matrix, where one dimension in the second matrix corresponds to a carrier frequency within a range of possible carrier frequency offsets and other dimension in the second matrix corresponds to a frequency in a range of possible sampling frequency offsets; and identifying an element in the second matrix with highest value, such that an index of one dimension hosting the identified element indicates a carrier frequency offset for the incoming signal and an index of other dimension hosting the identified element indicates a sampling frequency offset for the incoming sample.

In one example, the incoming signal is pulse-position modulated and the portion of the incoming signal is preferably the preamble of a data packet.

In some embodiments, the incoming signal is transmitted from a transmitter, where the transmitter excludes a phase-locked loop circuit and a frequency reference crystal.

In another aspect, a wireless communication system is presented. The wireless communication system is comprised of at least one sensor node and a gateway. The gateway includes a processor; and a storage medium having computer program instructions stored thereon, when executed by the processor, perform to receive an incoming signal over a wireless communication channel from the sensor node, where the incoming signal has a carrier oscillating at radio frequencies and at least a portion of the incoming signal is modulated by a a pulse stream with a constant interval between pulses; partition the portion of the incoming signal into a plurality of segments; for each segment in the plurality of segments, apply a transform to a given segment and stack results from the transform to build a first two dimensional matrix, such that the transform analyzes frequency content of the given segment, wherein one dimension in the first matrix corresponds to a carrier frequency within a range of possible carrier frequency offsets and other dimension in the first matrix corresponds to a different segment in the plurality of segments; for each carrier frequency in the range of possible carrier frequency offsets, apply the transform to data associated with a given carrier frequency and thereby generate a second two dimensional matrix, where one dimension in the second matrix corresponds to a carrier frequency within a range of possible carrier frequency offsets and other dimension in the second matrix corresponds to a frequency in a range of possible sampling frequency offsets; and identify an element in the second matrix with highest value, such that an index of one dimension hosting the identified element indicates a carrier frequency offset for the incoming signal and an index of other dimension hosting the identified element indicates a sampling frequency offset for the incoming sample.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

While a crystal-free PLL-less radio is necessary to enable ultra-small system integration and to lower power consumption, it inevitably sacrifices frequency stability. To address this, wireless communication systems employ a gateway assisted synchronization protocol that is initiated by sensor node transmission. In this protocol, the sensor node always initiates a communication session by transmitting a packet first. The gateway estimates and tracks the timing/frequency offset of the sensor node via a computationally efficient 2D-FFT based correlation (discussed below), and then it sends a customized packet that pre-compensates the timing/frequency offset of the sensor node. This gateway-assisted synchronization not only allows crystal-free sensor node implementation but also eliminates the need for a power-demanding synchronization/correlation process at the mm-scale sensor node. In one embodiment, the gateway protocol and real-time baseband signal processing are implemented on the FPGA of the USRP X310 software defined radio platform although other implementations as contemplated by this disclosure.

Figure 1:
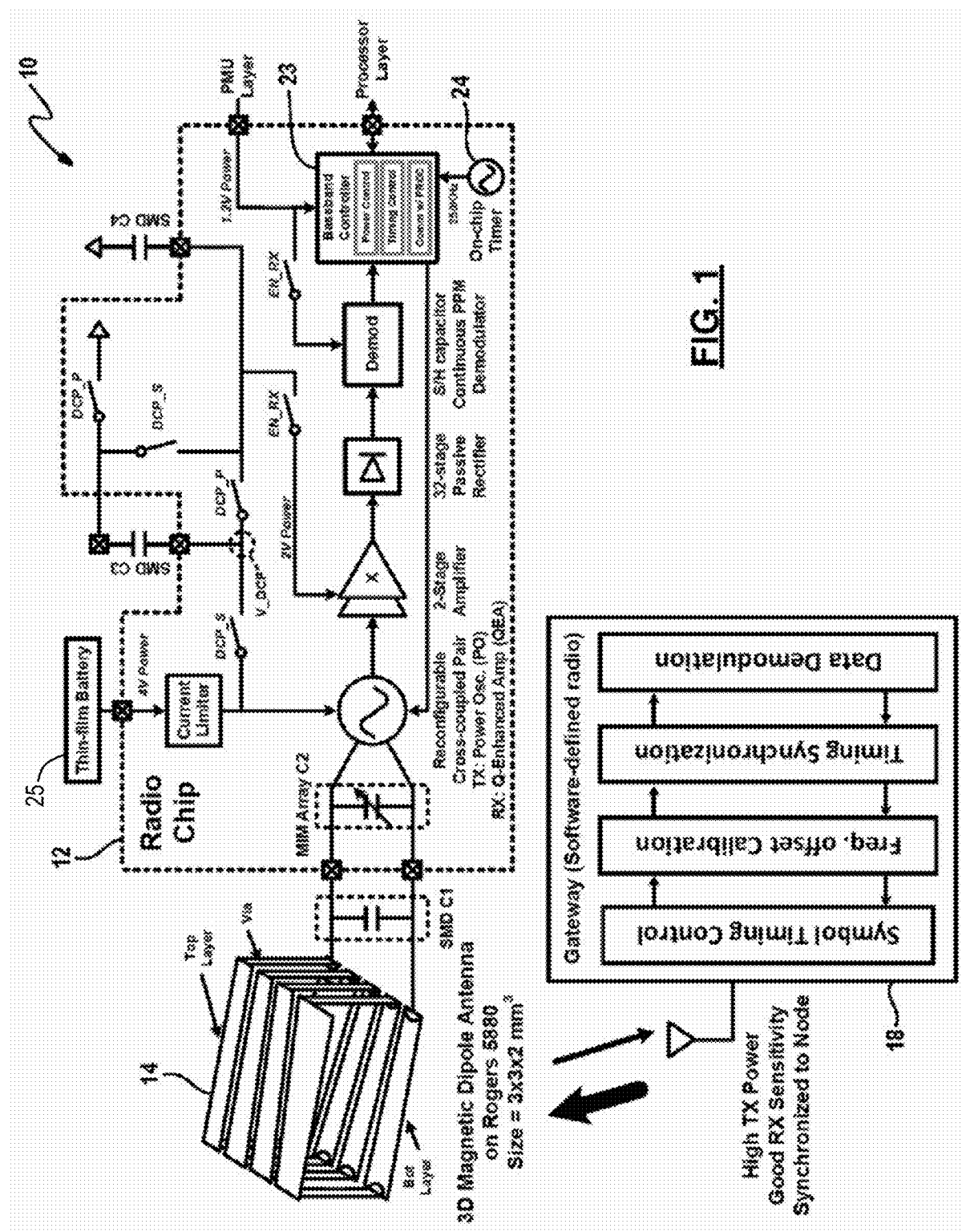
FIG. 1 is a block diagram of the proposed radio system with a miniature antenna, RF transceiver on the sensor node, and the SDR based gateway.

FIG. 1 depicts an example embodiment of the proposed radio system 10. The radio system 10 includes a sensor node (transmitter) 12 integrated onto a chip with a miniaturized antenna 14 and a gateway 18. More specifically, the sensor node 12 includes a RF front-end circuit 21, power management circuit 22, and a baseband controller 23 with a low-power on-chip timer 24. It is to be understood that only the relevant components are described in relation to FIG. 1, but that other components may be needed to control and manage the overall operation of the radio system.

Figure 2:
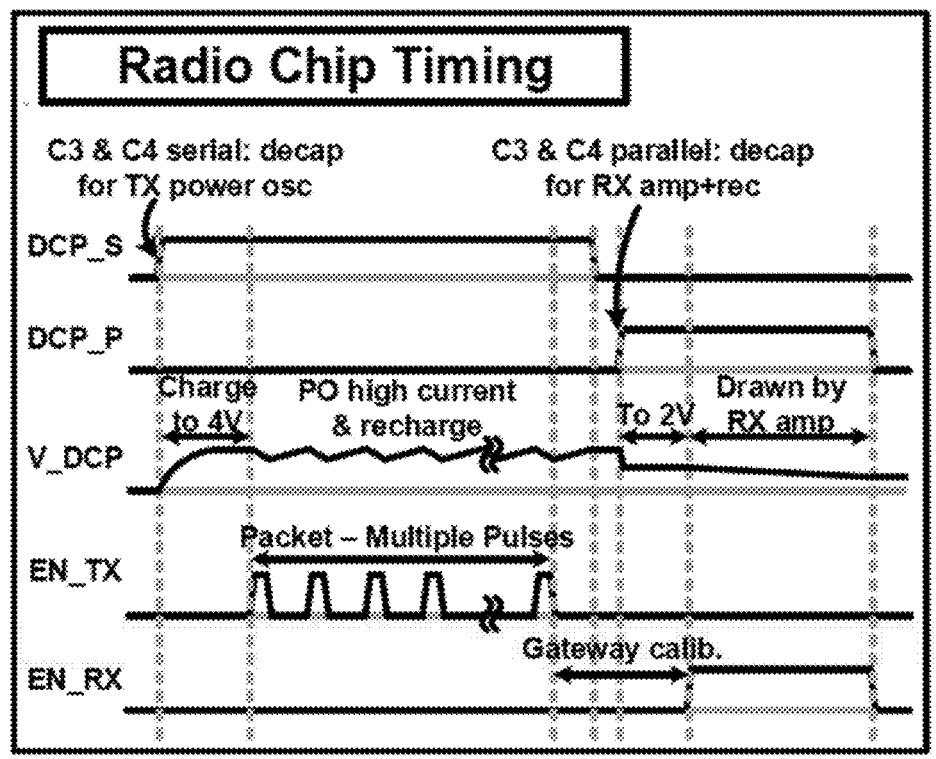
FIG. 2 is a diagram illustrating the signal timing for the RF transceiver.

During operation, the baseband controller 23 directly modulates the transmitter bias current to generate RF modulated pulses. The receiver performs energy detection with a Q-enhanced amplifier followed by additional amplifiers and a 32-stage passive rectifier. Because the transmitter and receiver operate at different voltage domains, the transceiver uses two off-chip energy buffer capacitors C3, C4 to generate two different voltages across either parallel- or series-configured capacitors. With reference to the timing diagram in FIG. 2, two capacitors are in series in the transmit mode and charged to 4V through the current limiter. In receive mode, on the other hand, capacitors are configured in parallel to generate 2V supply.

Figure 3:
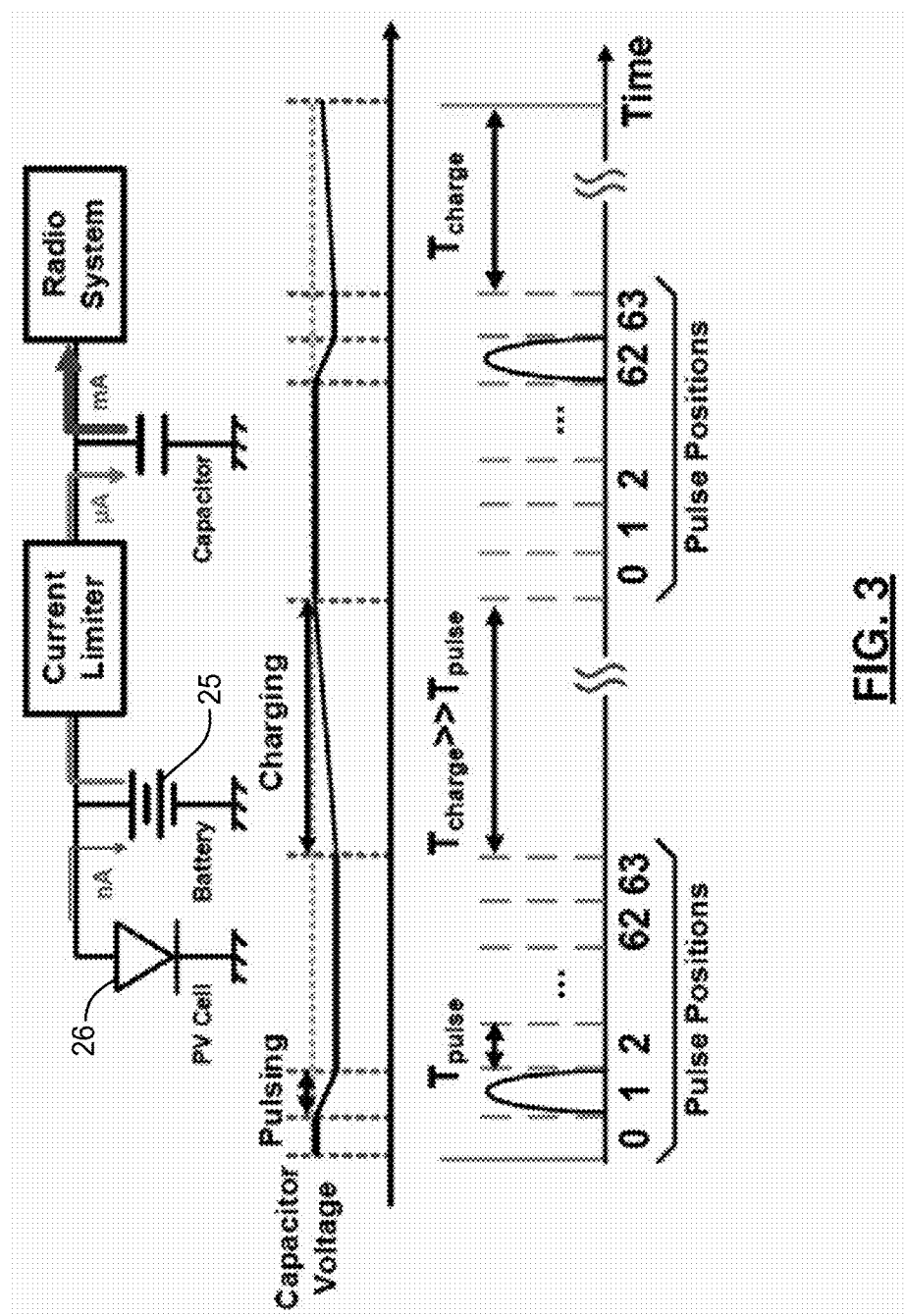
FIG. 3 is a diagram showing a modulation and recharging scheme.

A major issue of the mm-scale battery 25 is its high internal resistance, which prevents drawing large peak current (mA range) to transmit RF signals. This issue is tackled by powering the transceiver with a trickle charged energy buffer/reservoir capacitor. Instead of pulling current directly from the battery, the transmitter pulls high instantaneous current from the capacitor to generate RF pulses as shown in FIG. 3. The battery 25 is continuously recharged through the mm-scale PV cell 26 with variable harvested energy depending on the ambient light condition, ranging from a few nW in a dimmed indoor room to tens of µW under outdoor sunlight. After each pulse transmission, the battery trickle charges the capacitor to its nominal voltage. Since the recharging time is much longer than the pulse duration, the transmitted pulses are inevitably sparse in time domain. The proposed system exploits this sparsity to realize an energy efficient M-ary pulse position modulation (M-PPM) scheme, where each pulse can convey more than one information or coded bits. Unlike conventional M-PPM, the symbol duration is dominated by the recharging time, not by M pulse position slots. Hence the pulse rate degradation from the long recharging time is amortized by using a relatively large M. The transmitter supports a wide range of M=2, 4, 8, . . . , 64 to send up to 6 bits per pulse as shown in FIG. 3 for the improved energy efficiency of the pulse based modulation.

Figures 4A, 4B:
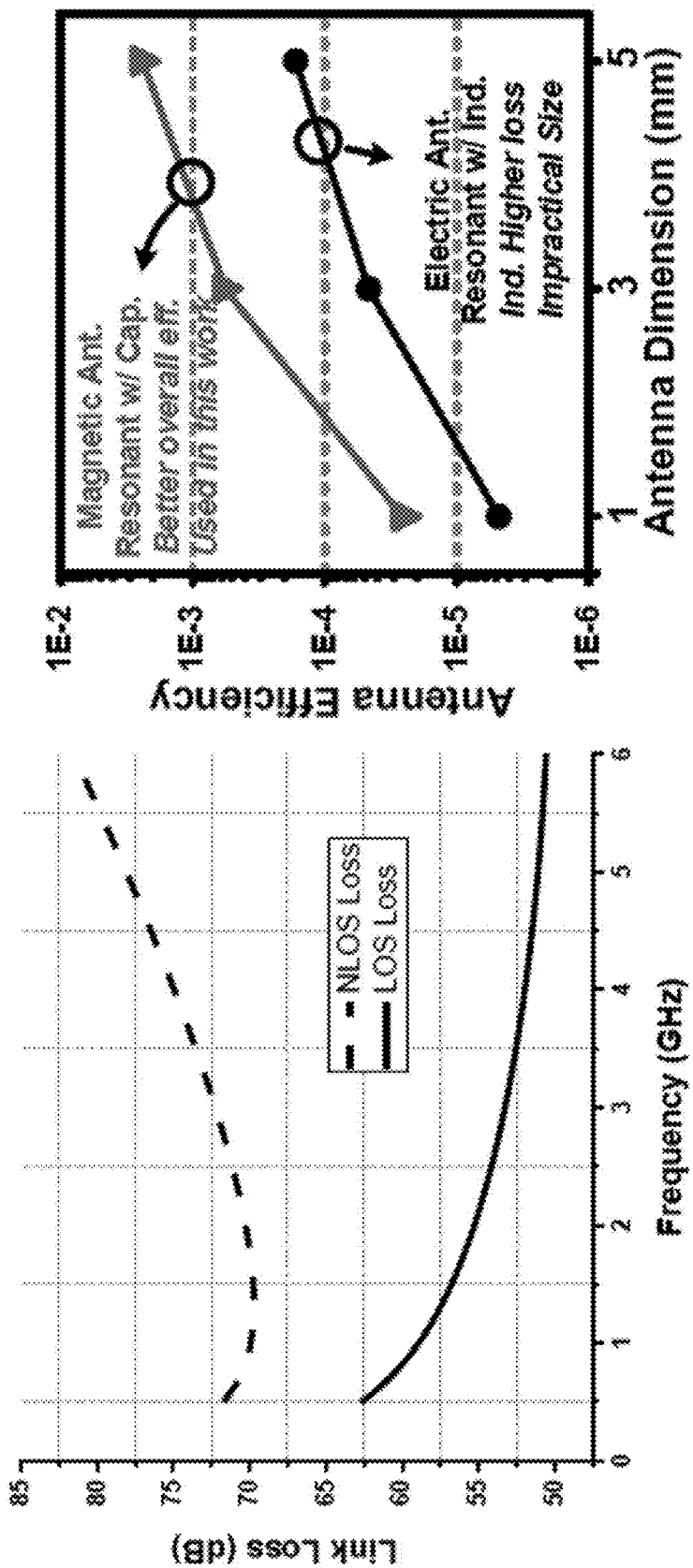
FIG. 4A is a graph showing link loss in LOS and NLOS at 1 meter distance for the antenna.
FIG. 4B is a graph showing overall antenna efficiency.

To find the optimal carrier frequency for the mm-scale radio system 10, the impact of carrier frequency was evaluated based on a modified ITU indoor path loss model. The floor penetration loss for NLOS communication is modeled by fitting the real measurement data. In FIG. 4A, link loss versus frequency, including the path loss at 1 meter distance, antenna efficiency, and the wall penetration loss is shown.

FIG. 4A shows that, in LOS, the link loss monotonically decreases as the carrier frequency increases to 6 GHz. This is due to the improved antenna efficiency at higher frequency given 3×3×2 $mm^3$ antenna dimension (FIG. 4B). For the same reason, mm-Wave has been a typical choice for prior mm-scale radio systems. However, the link loss analysis changes significantly if the wall penetration loss in NLOS conditions is considered. Floor or wall penetration incurs additional frequency-dependent signal attenuation, which offsets the better antenna efficiency at higher frequencies given 3×3×2 $mm^3$ antenna dimension. Including the frequency dependent floor/wall penetration loss reveals the optimal frequency of approximately 1 GHz for the minimum link loss in NLOS operations for our target system. Based on this analysis, the 915 MHz ISM band is selected as the system carrier frequency. This frequency selection can give: 1) better link loss in a NLOS environment, 2) less interference compared to a more crowed ISM band such as 2.4 GHz, and 3) lower power consumption for a relatively low carrier frequency generation.

Compared to the wavelength of the 915 MHz carrier frequency, the 3×3×2 $mm^3$ antenna dimension is small. The antenna 14 operates at an off-resonance point with very low radiation efficiency. Two categories of electrically small antennas were investigated. One is an electric dipole with capacitive impedance, and the other is a magnetic dipole with inductive impedance. The standalone electric dipole has better efficiency than the magnetic dipole given the mm-scale antenna dimension. However, in a practical antenna-circuit co-designed system, one needs to resonate (impedance match) the antenna at 915 MHz to generate the carrier frequency. The electric dipole needs hundreds of nH inductance for matching, which will be lossy and bulky. In contrast, the magnetic dipole requires only a few pF capacitance to match. A pF capacitor is available on-chip and typically realizable with a high Q. A fair comparison between electric and magnetic dipole antennas including the quality factor of resonant (matching) components is shown in FIG. 4B. When co-designed and matched with circuits for frequency generation, the magnetic dipole has higher efficiency for target mm-scale dimension. In addition, the magnetic dipole antenna allows one to put electronics on the top or bottom side of the antenna without significantly affecting the radiation efficiency. This is particularly useful to enable more compact integration of the mm-scale system. The antenna exhibits a 0.46% efficiency at 916 MHz from HFSS simulation.

Figure 5:
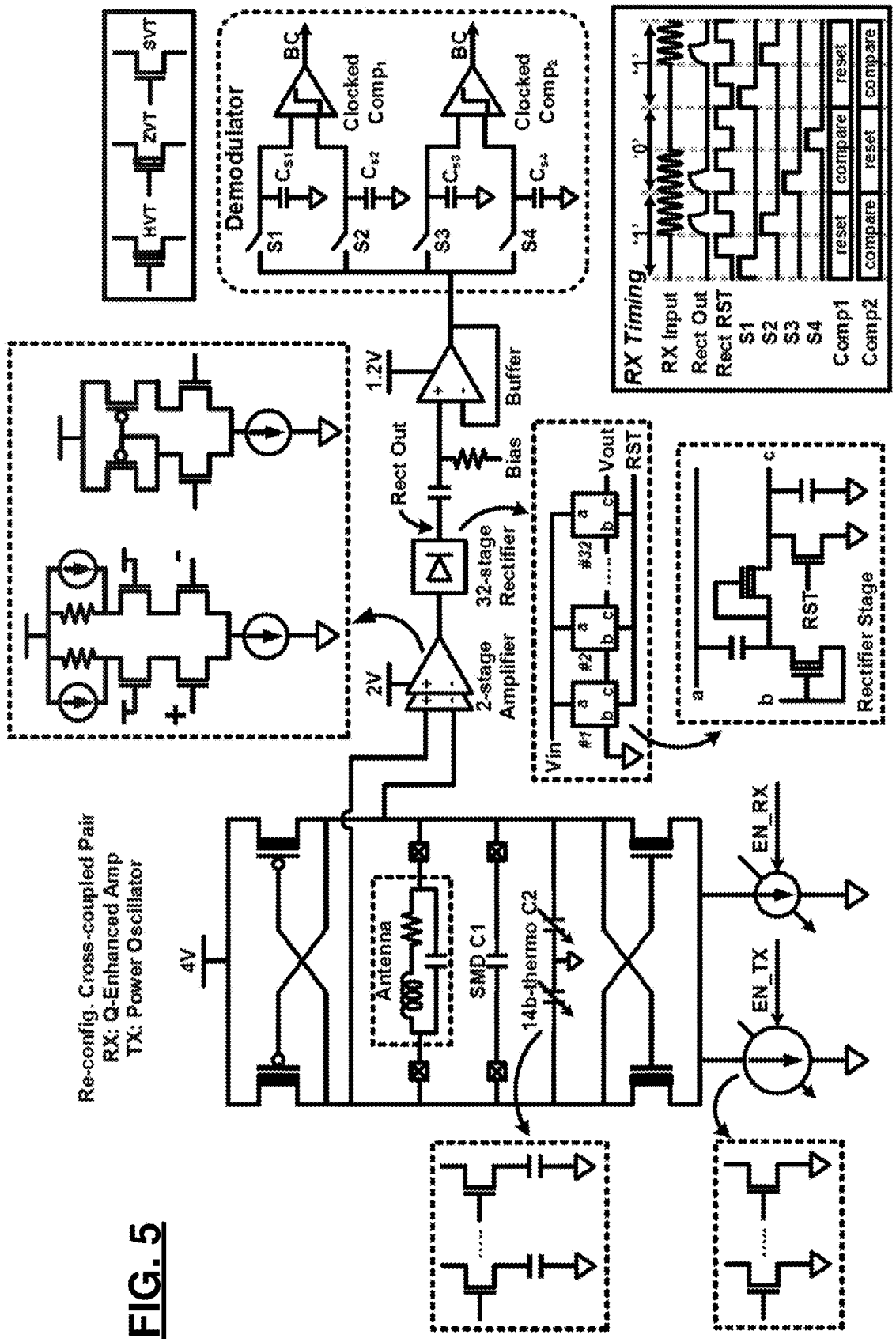
FIG. 5 is a schematic showing the transceiver circuits utilizing re-configurable cross-coupled pair as a power oscillator in transmit mode and a Q-enhanced amplifier in receive mode.

FIG. 5 further illustrates the RF front-end circuits 21 with timing details. In transmit mode, the baseband controller 23 directly modulates the EN_TX signal to transmit M-PPM modulated RF pulses. The sensor node 12 has a power oscillator structure that uses the antenna 14 as the resonant inductive component with 4V supply to maximize the output power. It transmits the signal through parallel amplification of the current flows through the antenna coil. This structure does not require an additional carrier frequency generation (local oscillator) circuitry, which typically consumes a significant portion of the transmitter power. The intrinsically high-Q antenna lowers the power consumption of oscillation, and the transmitter exhibits a measured efficiency of 14.8%. In order to maximize the Q of the oscillation tank, a high-Q off-chip SMD capacitor as the coarse frequency tuning component in addition to two on-chip capacitor banks for finer frequency tuning is used. One major challenge of this free-running oscillator approach is the RF carrier frequency offset (CFO) and drift. An efficient 2D-FFT based real-time carrier frequency offset mitigation technique performed on the gateway is further described below.

Figure 6B:
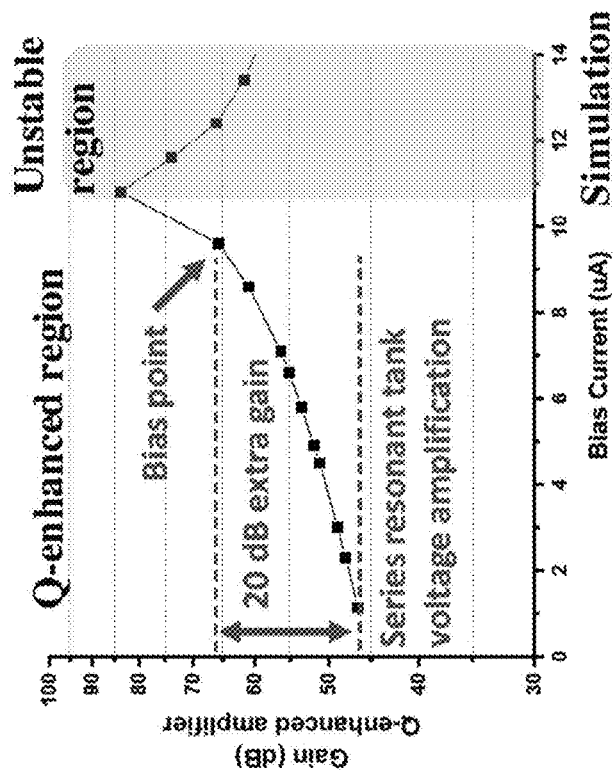
FIG. 6B shows Q-enhanced amplifier-simulation gain result of QEA.
Figure 6A:
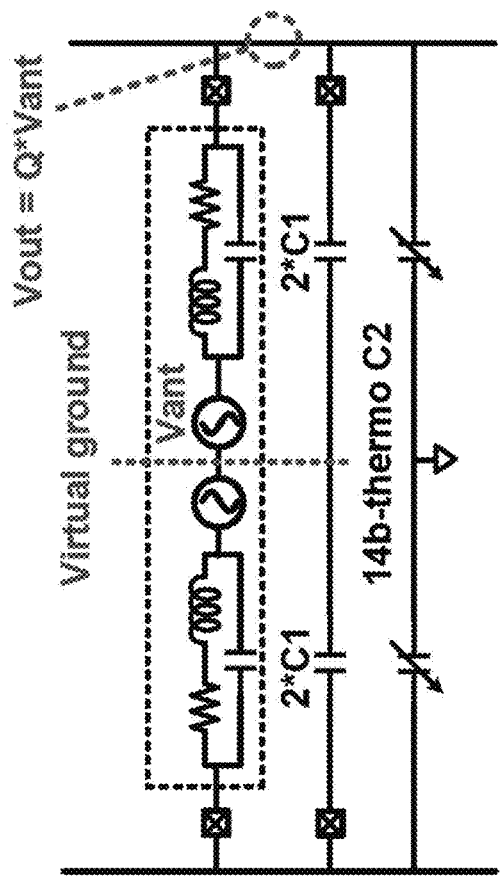
FIG. 6A shows Q-enhanced amplifier-half-circuit analysis.

In receive mode, a Q-enhanced amplifier (QEA) is employed in the front-end followed by a 2-stage amplifier and a 32 stage rectifier, which serves as an envelope detector (ED). Unlike the adaptive sparse M-PPM uplink signals, the downlink signal from the gateway 18 is always binary PPM modulated without a long (recharge) interval between symbols. For demoluation of the binary PPM, the receiver compares the energy at two consecutive pulse positions. This scheme eliminates the need for a carefully tuned threshold voltage for the comparator in conventional on-off keying (OOK) receivers. The proposed relative energy comparison approach for binary PPM also results in better interference tolerance compared to OOK. The RX demodulation timing is shown in the lower right of FIG. 5. For the QEA, the transceiver disconnects the cross-coupled pair and taps out the Vout point as shown in FIG. 6A. This configuration is different from the parallel resonant circuit formed in the transmit mode. The antenna and the tuning capacitor form a series resonant circuit so that the received voltage is amplified by the factor of Q. FIG. 6B shows the Q-enhanced amplifier gain versus the bias current plot. The bias current with a sufficient back-off margin to ensure its stability is set. The boosted-Q provides additional 20 dB gain at RF with very low power consumption (40 µW). In addition, the high-Q tank enables a highly band-selective front-end filter, which increases the receiver blocker tolerance and eliminates the need for an off-chip channel selection filter. Unlike super-regenerative receivers, the proposed Q-enhanced amplifier does not have the oscillation period or the re-radiation issue. This allows safety co-designing the QEA with the antenna without an isolation amplifier, which is typically required in the super-regenerative receiver.

In an example embodiment, the radio system 10 uses an asymmetric link between the gateway and distributed sensor nodes as the gateway has much relaxed constraints on power, complexity, and form-factor dimension. In this example, the radio system 10 is based on a star network topology, where every sensor node is individually linked to a nearby gateway. The real-time gateway realized on the USRP platform has excellent receiver sensitivity, high transmitter power, and abundant FPGA resources for digital signal processing. In the proposed sensor initiating protocol, the sensor node is mostly in sleep in order to save energy, while the gateway receiver is always listening to the channel to find connection messages initiated by nearby sensor nodes. As a result, real-time bi-directional communication is demonstrated between mm-scale sensor nodes and an USRP based gateway. Other network arrangements for the radio system are contemplated by this disclosure.

Figure 7:
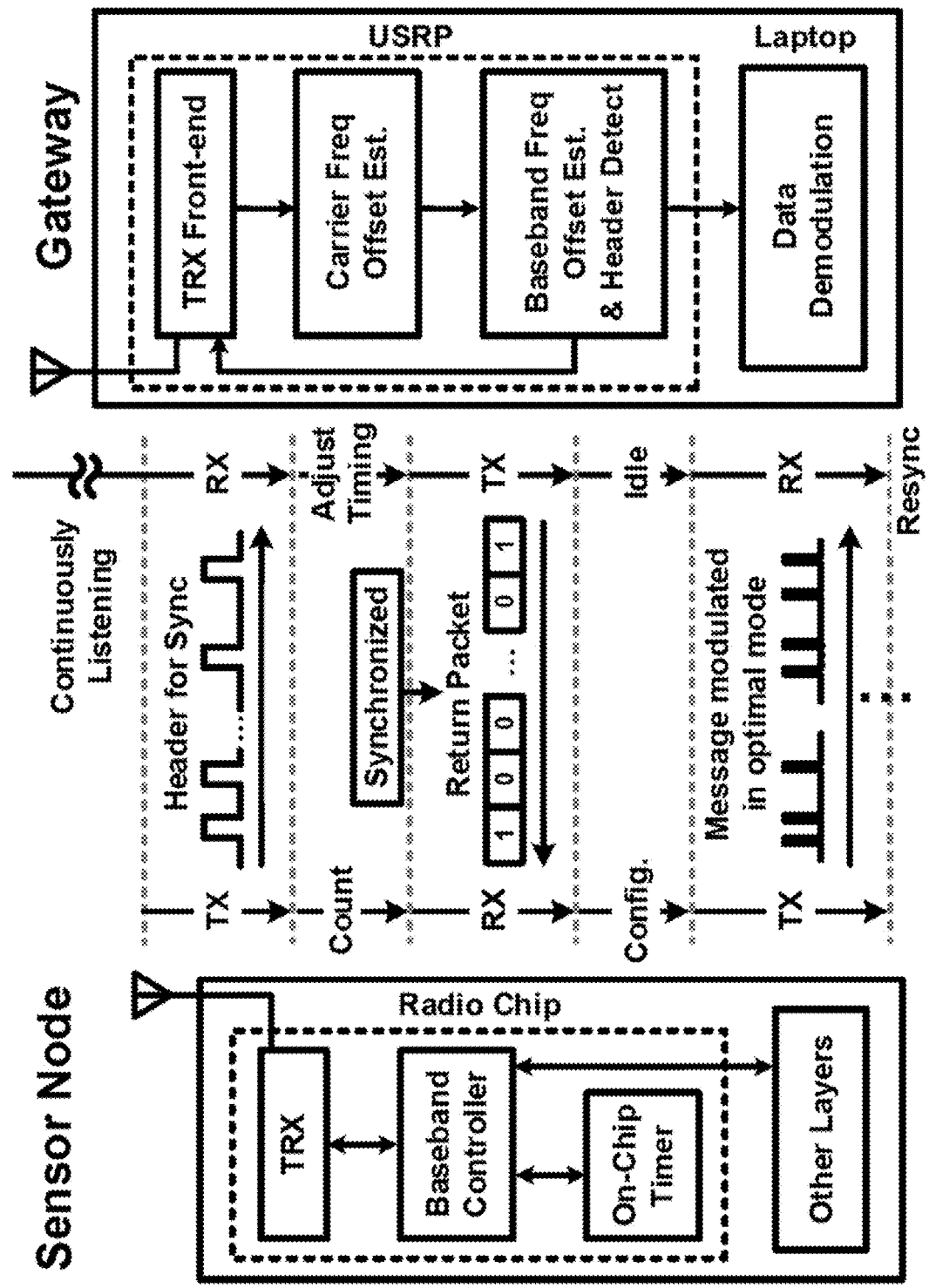
FIG. 7 shows an adaptive sensor-initiation synchronization communication protocol.

Synchronization between the mm-scale sensor node 12 and the gateway 18 is entirely performed on the gateway. It is gateway's responsibility to track and adapt to the baseband and carrier frequency offset of each sensor node. The gateway analyzes the channel quality and send configuration commands to the sensor node with optimal modulation settings, enabling dynamic link adaptation. The timing diagram of the protocol is shown in FIG. 7.

In the example embodiment, the sensor node 12 supports convolutional codes with variable coding rates of 4, 3, 2, 1, ½, ⅓, and ¼. The coding rate is equivalent to the number of information bits conveyed by a single pulse. For illustration, coding rates greater than one are done using higher-order modulation (e.g., M-PPM) while coding rates less than one is the result of applying a channel coding, such as convolutional code. Adaptive modulation parameters supported by the system include the pulse width (4 μs-1 ms), coding rate, and the recharging time interval (0-32 ms).

The sensor node 12 first initiates the communication by sending a signal. The gateway 18 is continuously listening to the channel. After a packet is received, the gateway 18 starts analyzing and calculating the carrier and baseband sampling frequency offset. The sensor node 12 that initiated the communication enters the receive mode after a pre-defined waiting time measured by a ultra-low power timer in the sensor node. During this turn-around time, the gateway 18 estimates and adjusts its baseband timing and carrier frequency to compensate the offset estimated from the sensor node packet. Hence the return packet is synchronized to each sensor node's local timer without explicit synchronization or header detection process performed on the sensor node. The demodulation process on the sensor node 12 is greatly simplified as it starts demodulating symbols at a pre-defined time slot measured by the local low-power relaxation oscillator based timer.

The main challenge in the design of the gateway 18 is to identify the frequency and timing offsets with the sensor node 12 in real-time. The TX-RX turn-around time of the sensor node imposes a strict latency constraint on this real-time synchronization process. The sensor node 12 does not have a crystal oscillator. Instead, its baseband sampling clock is generated by a RC relaxation oscillator. Its carrier frequency is determined by the inductance value of the 3D magnetic dipole antenna and the matching on-/off-chip capacitors without a PLL. Thus, it is inevitable that the sensor node 12 has significant baseband sampling frequency offset (SFO, up to 0.5%) as well as carrier frequency offset (CFO, up to 2%) affected by PVT variations. Calculating accurate of the sampling frequency offset and the carrier frequency offset and compensating these offsets for the return packet in real-time is performed by the gateway, for example on the FPGA of the USRP platform.

Figure 8:
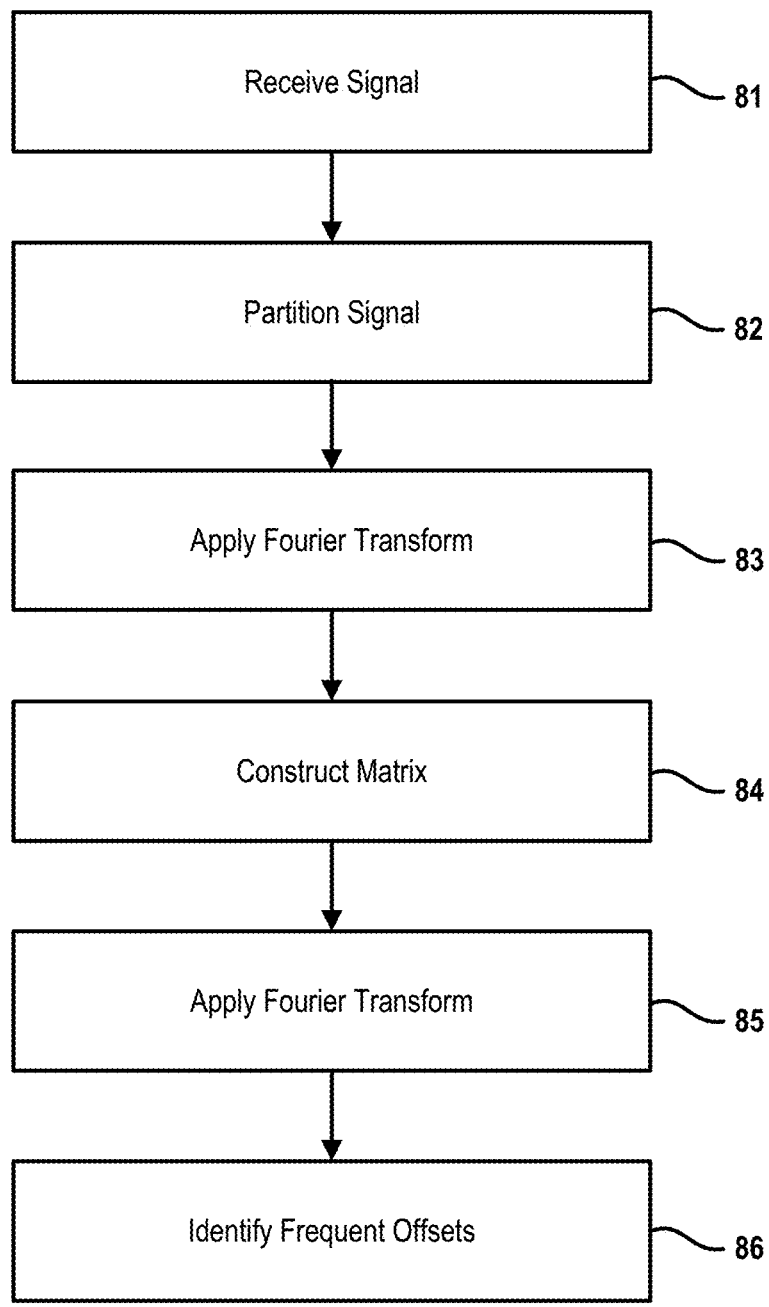
FIG. 8 is a flowchart depicting an example technique for determining frequency offsets.

FIG. 8 depicts a proposed method for determining carrier frequency offset and/or sampling frequency offset in a wireless communication system. An incoming signal is received at 81 by a signal processor of a receiver (e.g., the gateway) in the wireless communication system. The signal is sent over a wireless communication channel by a transmitter. The incoming signal has a carrier oscillating at radio frequencies and at least a portion of the incoming signal is modulated by a periodic symbol. In one embodiment, the incoming signal is modulated by a pulse stream with a constant interval between pulses (e.g., pulse-position modulated as described above). The portion of the incoming signal modulated by the pulse stream (e.g., preamble) is partitioned at 82 into a plurality of segments. In the example embodiment, each segment is equal to one pulse length although other segment lengths also fall within the scope of this disclosure.

In an example embodiment, the packet includes three parts: preamble, pseudo-random (PN) sequence, and data payload, where the preamble is used for packet detection and CFO/SFO estimation, the PN sequence is used for detecting payload start time, and information data is embedded in data payload. More specifically, binary pulse position modulation (2-PPM) may be used to modulate 0 or 1, where the information bits determine the position of the pulses. There is silence period between each pulse for capacitor recharging. Because the preamble is a sequence that is all 0's, the preamble contains a pulse train with a constant interval between each pulse.

For each segment in the plurality of segments, a Fourier transform is applied to a given segment in the plurality of segments as indicated at 83. In the example embodiment, a fast Fourier transform is applied although other transforms which analyze frequency content of a segment are contemplated by this disclosure. Results from the Fourier transform are stacked at 84 to build a first two dimensional matrix, where one dimension (e.g., y-axis) in the first matrix corresponds to a carrier frequency within a range of possible carrier frequency offsets and other dimension (e.g., x-axis) in the first matrix corresponds to a different segment in the plurality of segments. Since the signal is modulated at some high frequency and after down converting the target carrier frequency with some offset, the pulse will contain power in a certain frequency bin, which is its carrier frequency offset. When the window is in the recharging cycle, there is no signal so the received power will be very small. Therefore, within the correct carrier frequency offset bin, there will be a pattern of pulse train, with the resolution in one window (or pulse) size. For frequency bins far from the correct carrier frequency offset, the power will be small.

Next, a second Fourier transform is applied at 85. Specifically, for each carrier frequency in the range of possible carrier frequency offsets, a Fourier transform is applied to the data associated with a given carrier frequency and thereby generate a second two dimensional matrix, where one dimension (y-axis) in the second matrix corresponds to a carrier frequency within a range of possible carrier frequency offsets and other dimension (x-axis) in the second matrix corresponds to a frequency in a range of possible sampling frequency offsets. To examine power in each carrier frequency offset bin, results are converted to power by squaring them before applying the second Fourier transform.

Figure 9:
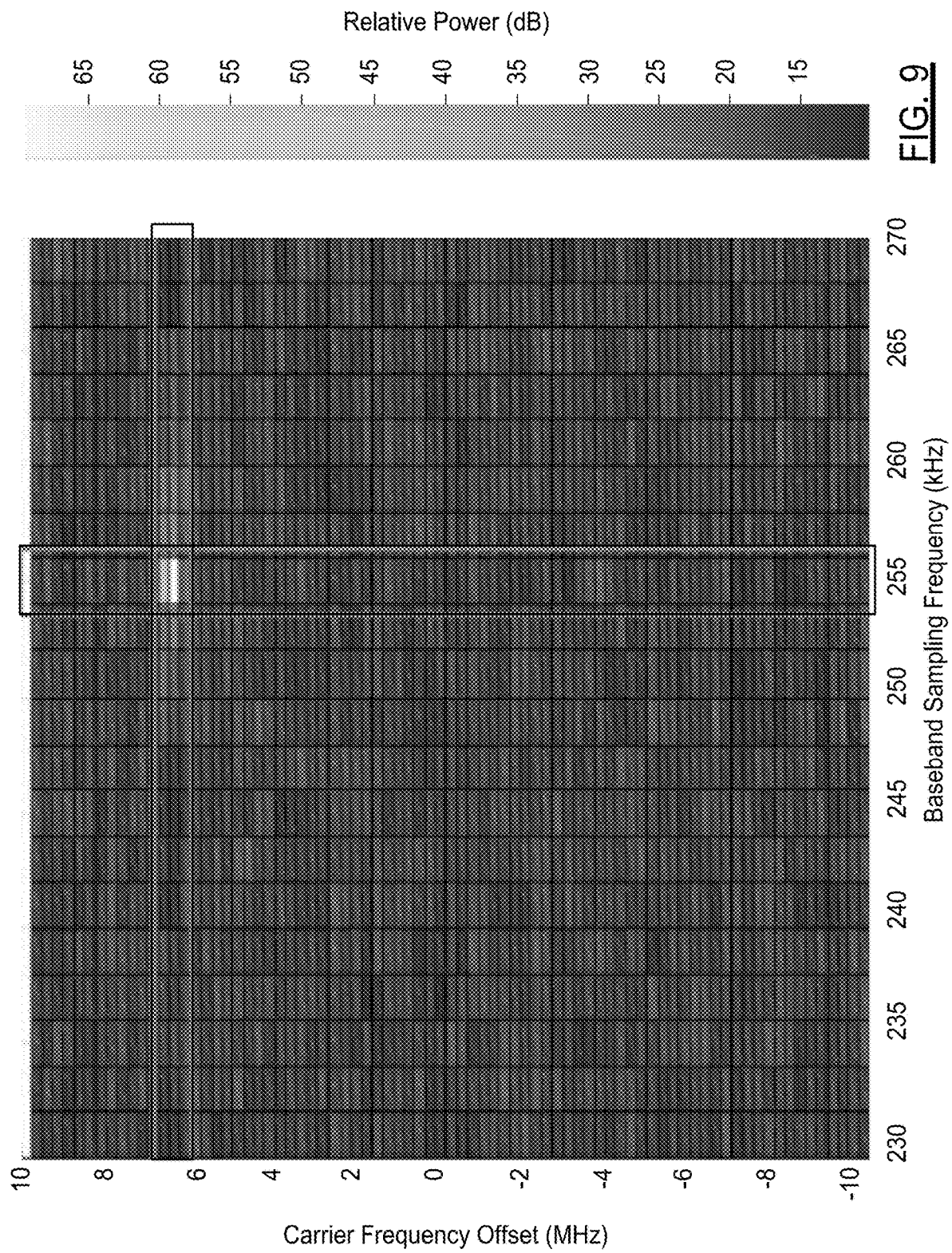
FIG. 9 shows an example 2D FFT map.

In a simplified approach, an element in the second matrix with highest value is identified at 86, such that an index of one dimension hosting the identified element indicates a carrier frequency offset for the incoming signal and an index of other dimension hosting the identified element indicates a sampling frequency offset for the incoming sample as shown in FIG. 9. Because the preamble is a pulse train with constant intervals, power will appear at a certain frequency and its harmonics. In a more robust approach, power at the certain frequency is summed with the power at its harmonics and then an element in the second matrix with the highest value is identified. In either case, the result is a two-dimensional matrix where one dimension indicates the carrier frequency offset and the other dimension indicates the sampling frequency offset.

Figure 10:
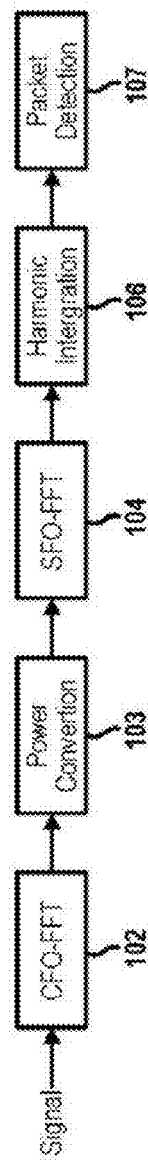
FIG. 10 show an example datapath implemented on the gateway.

FIG. 10 depicts an example signal processing datapath implemented on the gateway 18 of the proposed radio system 10. The incoming signal is first divided into multiple time domain signal frames, whose length is equivalent to one pulse length. A 1D-FFT is performed on each signal frame at 102 and signal power is computed at 103 for each frequency offset bin, which correspond to a specific CFO hypotheses. A second FFT is performed at 104 on the sample power of frequency domain samples (output of the first FFT) that belong to that same bin (one specific CFO). This process is repeated for all frequency bins. Each bin of the second FFT output now corresponds to a specific SFO fundamental frequency. To accurately estimate the actual pulse repetition frequency of the header, the power of all harmonic frequency bins corresponding to a specific fundamental frequency can be added together as indicated at 106.

To ensure that the incoming signal correlates to a packet, the element in the matrix with highest value is compared to a threshold at 107. In one example, the threshold is normalized to the received signal power value. If the maximum value in the 2D map is above the threshold, a packet is presumed to be detected. When a packet is detected, carrier frequency offset and sampling frequency offset are estimated from the 2D map.

Returning to FIG. 9, an example of the 2D-FFT harmonic integration output is shown, where the y-axis corresponds to the carrier frequency offset bin and x-axis is the sampling frequency offset fundamental frequency hypothesis. By finding the maximum power from the 2D-FFT result, the gateway identifies the sampling frequency offset as well as the carrier frequency offset at the same time. The carrier frequency offset FFT resolution is inversely proportional to the header pulse width, which is 1-250 kHz in the proposed radio system. FIG. 9 is the result for 6.5 MHz CFO and 5 kHz SFO from the 915 MHz and 250 kHz ideal carrier and sampling frequencies. After the 2D-FFT process for header detection, the gateway keeps tracking sampling frequency offset during data payload demodulation to eliminate residual sampling frequency offset and to mitigate the time-drifting offset. At the end of the payload demodulation, the final sampling frequency offset is applied to calculate the return packet transmission time and its symbol/sampling rate.

Figure 11:
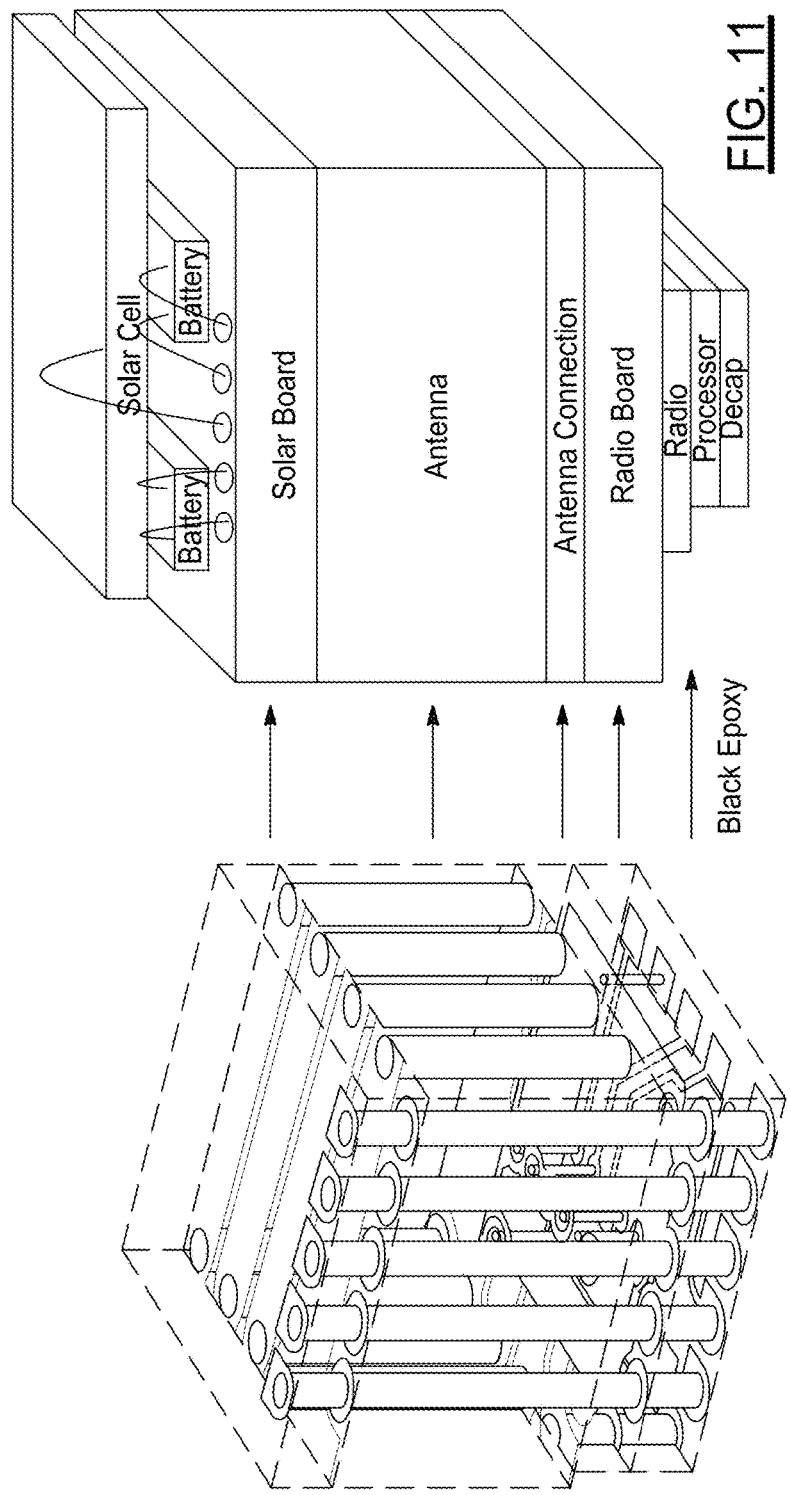
FIG. 11 shows an example radio system integration.

FIG. 11 is a system integration diagram. The radio system 10 integrates four custom boards connected with vias. From the top to the bottom, it shows the solar board, antenna, antenna connection board, and radio board. The solar board is used to mount batteries and the PV cell, which are connected to the radio board with five through-hole vias. The antenna connection board is used to separate the ground plane from the radio board and to avoid radiation efficiency degradation of the 3D antenna. Chips are stacked and mounted to the radio board. The system has a total of three off-chip capacitors: two 1 µF decaps and one antenna tuning cap. Electronic components are directly stacked on top of the 3D magnetic dipole antenna. This is a significant advantage over the electric dipole antenna, which usually requires a certain keep out area to maintain radiation performance. Block epoxy is applied to cover the chip stack because ultra-low power chips are highly sensitive to light. The final system has two thin-film batteries and one PV cell on the solar board which is clear epoxy coated to allow energy harvesting.

Figure 12A:
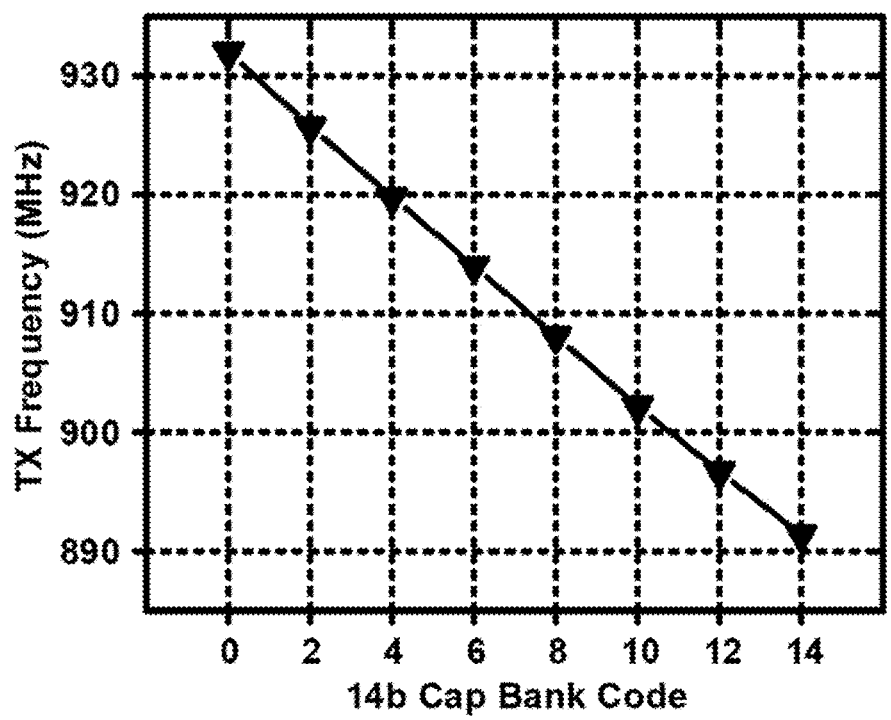
FIG. 12A is a graph showing the transmitter performance in a tuning range.
Figure 12B:
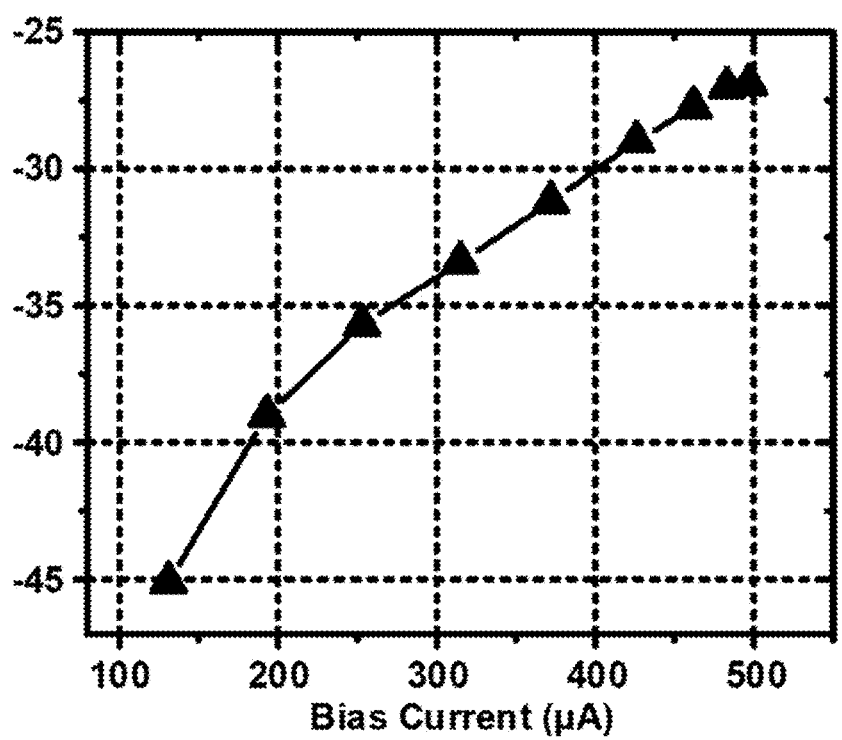
FIG. 12B is a graph showing the transmitter performance in EIRP versus bias current.

FIG. 12A shows the carrier frequency tuning range of the transmitter. The x-axis is the tuning thermometer code and the y-axis is the carrier frequency. On-chip capacitor banks for tuning are used. It has 14 tuning bits with a 40 MHz tuning range. FIG. 12B is the measured EIRP as a function of the transmitter bias current. The maximum EIRP including the antenna gain was measured at −26.9 dBm with 500 µA bias current. The peak instantaneous power consumption for pulse transmission is 2 mW from 4V. The average power consumption for packet transmission is 60.6 µW at 7.3 kbps data rate using 4 µs pulse width, 128 µs recharging time, and a binary PPM coding rate of 1.

Figure 13:
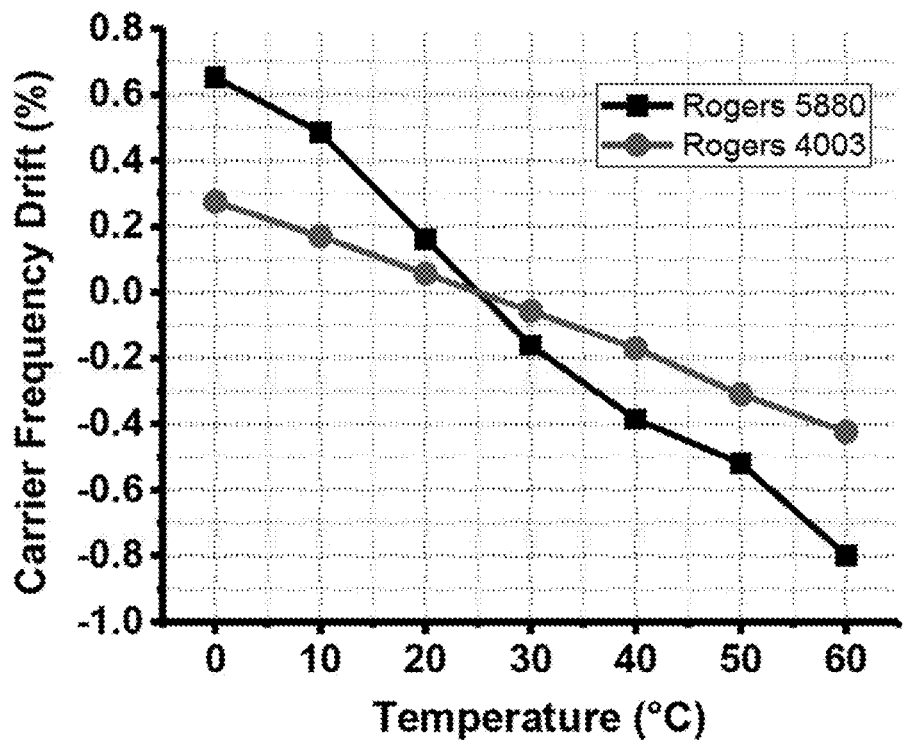
FIG. 13 is a graph showing carrier frequency drift with temperature in different antenna material (normalized to 25 degree Celsius).

FIG. 13 shows the carrier frequency drift with temperature from 0 to 60 degree Celsius. An experiment with two different antenna PCB materials (Rogers 5880/4003) was performed. The main reason for frequency drift is temperature-dependent physical expansion of the antenna that significantly changes the equivalent inductance. The result shows a <1% frequency drift across temperature, which can be reduced by using a more rigid PCB material such as Rogers 4003. This carrier frequency drift range is rather significant compared to a conventional system with a PLL. However the proposed system can successfully mitigate this issue using the real-time CFO tracking technique implemented on the gateway.

Figure 14:
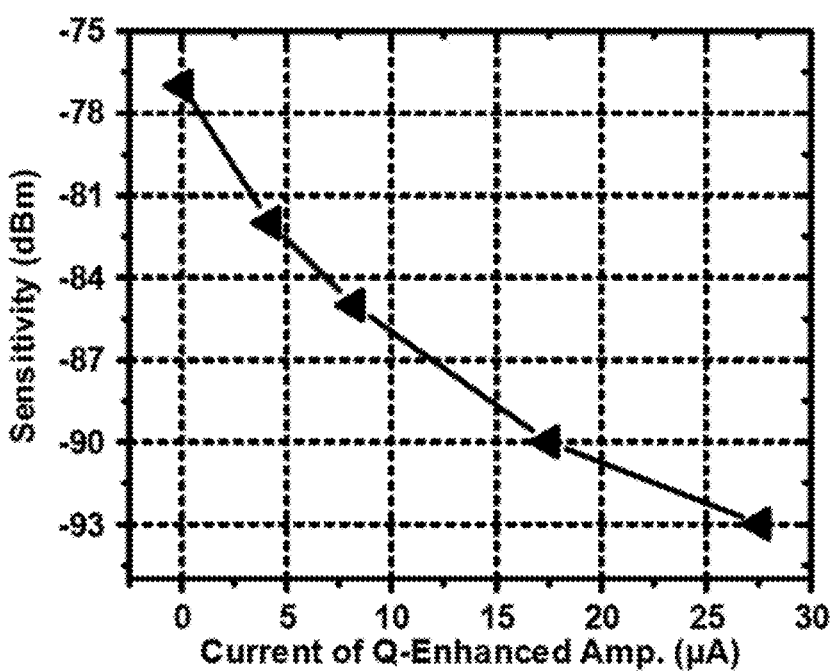
FIG. 14 is a graph showing sensitivity at $10^{-3}$ BER versus bias current of QEA.
Figure 15:
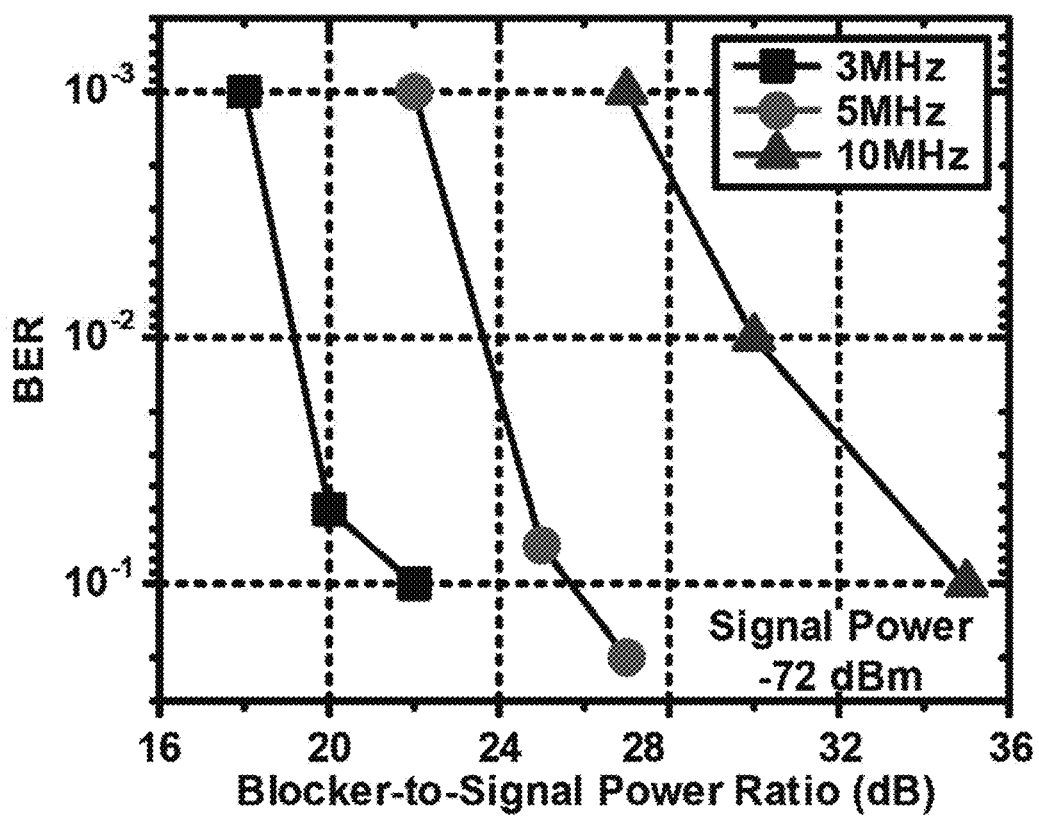
FIG. 15 is a graph showing blocker tolerance at different frequency offset.

FIG. 14 shows the sensitivity as a function of the Q-enhanced amplifier bias current. Because the front-end is co-designed with the antenna and not impedance-matched to 50Ω, the receiver sensitivity cannot be measured via a wired test. Therefore, sensitivity wirelessly via turnaround communication with the gateway is measured and by measuring the minimum RX signal power level (monitored at a reference antenna next to the sensor node) at which the sensor node fails to demodulate the return packet from the gateway. The sensitivity was measured at −93 dBm for 30 kbps data rate with $10^{-3}$ BER. Because the receiver demodulates the binary PPM by comparing relative power difference between consecutive pulse positions, a single-tone unmodulated blocker does not strongly degrade the receiver performance. Hence an interference test was conducted with a pulse position modulated blocker with carrier frequency offsets of 3 MHz, 5 MHz and 10 MHz as shown in FIG. 15. The system exhibits good blacker tolerance of at least 20 dB rejection (at $10^{-1}$ BER) for a modulated blacker that is ≥3 MHz away thanks to the highly band-selective Q-enhanced amplifier.

A fully integrated 3×3×3 mm³ ultra-low power radio system is demonstrated for wireless bi-directional communication. Of note, a low-power asymmetric communication protocol was proposed and implemented on an FPGA based software-defined radio platform for real-time demonstration. The transceiver, co-designed with the mm-scale 3D magnetic dipole antenna, consumes 60.6 pW average power at 7 kbps for transmission, while the receiver consumes 1.85 mW with a −93 dBm sensitivity at 30 kbps. The complete radio system demonstrates >20 meter communication distance in a challenging indoor NLOS environment. The proposed solution enables wireless communication for ultra-small sensing devices, increasing their potential use in unobtrusive IoT sensing applications.

The techniques described herein may be implemented by one or more computer programs executed by one or more processors residing in a sensor node and/or a gateway. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for determining frequency offsets in a wireless communication system, comprising:
   receiving, at signal processor of a receiver, an incoming signal over a wireless communication channel from a transmitter, where the incoming signal has a carrier oscillating at radio frequencies and at least a portion of the incoming signal is modulated by a periodic symbol;
   partitioning, by the signal processor, the portion of the incoming signal into a plurality of segments;
   for each segment in the plurality of segments, applying, by the signal processor, a transform to a given segment and stacking results from the transform to build a first two dimensional matrix, where the transform analyzes frequency content of the given segment, wherein one dimension in the first two dimension matrix corresponds to a carrier frequency within a range of possible carrier frequency offsets and other dimension in the first two dimension matrix corresponds to a different segment in the plurality of segments;
   for each carrier frequency in the range of possible carrier frequency offsets, applying, by the signal processor, the transform to data associated with a given carrier frequency and thereby generate a second two dimensional matrix, where one dimension in the second two dimension matrix corresponds to a carrier frequency within a range of possible carrier frequency offsets and other dimension in the second two dimension matrix corresponds to a frequency in a range of possible sampling frequency; and
   identifying an element in the second matrix with highest value, where an index of one dimension hosting the identified element indicates a carrier frequency offset for the incoming signal and an index of other dimension hosting the identified element indicates a sampling frequency for the incoming signal.

2. The method of claim 1 wherein the incoming signal is pulse-position modulated.

3. The method of claim 1 wherein the portion of the incoming signal is further defined as preamble of a data packet.

4. The method of claim 1 further comprises modulating the incoming signal by a pulse stream with a constant interval between pulses and where length of each segment in the plurality of segments is length of one pulse in the pulse stream of the incoming signal.

5. The method of claim 1 further comprises transmitting the incoming signal from a transmitter, where the transmitter excludes a phase-locked loop circuit and a frequency reference crystal.

6. The method of claim 1 further comprises decoding, by the signal processor, the incoming signal using at least one of the carrier frequency offset or the sampling frequency.

7. The method of claim 1 further comprises sending, by the receiver, a signal to the transmitter, where the signal includes at least one of the carrier frequency offset or the sampling frequency.

8. A method for determining frequency offsets in a wireless communication system, comprising:
   receiving, at signal processor of a gateway, an incoming signal over a wireless communication channel from a transmitting node, where the incoming signal has a carrier oscillating at radio frequencies and at least a portion of the incoming signal is modulated by a pulse stream with a constant interval between pulses;
   partitioning, by the signal processor, the portion of the incoming signal into a plurality of segments;
   for each segment in the plurality of segments, applying, by the signal processor, a Fourier transform to a given segment and stacking results from the Fourier transform to build a first two dimensional matrix, where one dimension in the first two dimension matrix corresponds to a carrier frequency within a range of possible carrier frequency offsets and other dimension in the first two dimension matrix corresponds to a different segment in the plurality of segments;
   for each carrier frequency in the range of possible carrier frequency offsets, applying, by the signal processor, Fourier transform to data associated with a given carrier frequency and thereby generate a second two dimensional matrix, where one dimension in the second two dimension matrix corresponds to a carrier frequency within a range of possible carrier frequency offsets and other dimension in the second two dimension matrix corresponds to a frequency in a range of possible sampling frequency offsets; and
   identifying an element in the second matrix with highest value, where an index of one dimension hosting the identified element indicates a carrier frequency offset for the incoming signal and an index of other dimension hosting the identified element indicates a sampling frequency for the incoming signal.

9. The method of claim 8 wherein the incoming signal is pulse-position modulated.

10. The method of claim 8 wherein the portion of the incoming signal which includes the pulse stream is further defined as preamble of a data packet.

11. The method of claim 8 where length of each segment in the plurality of segments is length of one pulse in the pulse stream of the incoming signal.

12. The method of claim 8 further comprises transmitting the incoming signal from the transmitting node, where the transmitting node excludes a phase-locked loop circuit and a frequency reference crystal.

13. The method of claim 8 further comprises decoding, by the signal processor, the incoming signal using at least one of the carrier frequency offset or the sampling frequency.

14. A wireless communication system, comprising
   a sensor node; and
   a gateway, wherein the gateway includes
      a processor; and
      a storage medium having computer program instructions stored thereon, when executed by the processor, perform to:
      receive an incoming signal over a wireless communication channel from the sensor node, where the incoming signal has a carrier oscillating at radio frequencies and at least a portion of the incoming signal is modulated by a pulse stream with a constant interval between pulses;
      partition the portion of the incoming signal into a plurality of segments;
      for each segment in the plurality of segments, apply a transform to a given segment and stack results from the transform to build a first two dimensional matrix, where the transform analyzes frequency content of the given segment, wherein one dimension in the first two dimension matrix corresponds to a carrier frequency within a range of possible carrier frequency offsets and other dimension in the first two dimension matrix corresponds to a different segment in the plurality of segments;
      for each carrier frequency in the range of possible carrier frequency offsets, apply the transform to data associated with a given carrier frequency and thereby generate a second two dimensional matrix, where one dimension in the second two dimension matrix corresponds to a carrier frequency within a range of possible carrier frequency offsets and other dimension in the second two dimension matrix corresponds to a frequency in a range of possible sampling frequency; and
      identify an element in the second matrix with highest value, where an index of one dimension hosting the identified element indicates a carrier frequency offset for the incoming signal and an index of other dimension hosting the identified element indicates a sampling frequency for the incoming signal.

15. The system of claim 14 wherein the sensor node does not include a phase-locked loop circuit and a frequency reference crystal.

16. The system of claim 14 wherein the computer program instructions further perform to decode the incoming signal using at least one of the carrier frequency offset or the sampling frequency.

17. The system of claim 14 wherein the computer program instructions further perform send a signal to the sensor node, where the signal includes at least one of the carrier frequency offset or the sampling frequency.

18. The system of claim 14 wherein the computer program instructions further perform to adjust a tracking signal.

\* \* \* \* \*